United States Patent [19]
Fukuda

[11] 3,950,149
[45] Apr. 13, 1976

[54] METHOD FOR CONTINUOUSLY PRODUCING RESINOID WHEELS

[76] Inventor: Heijiro Fukuda, No. 123, 3-chome, Umegaoka, Nagaokakyo, Kyoto, Japan, 617

[22] Filed: May 16, 1974

[21] Appl. No.: 470,419

[52] U.S. Cl. .................................. 51/298 R; 51/293
[51] Int. Cl.² ........................................... C09K 3/14
[58] Field of Search .............. 51/293, 295, 297, 298

[56] References Cited
UNITED STATES PATENTS

| | | |
|---|---|---|
| 3,249,410 | 5/1966 | Lorenzo et al. ........................ 51/293 |
| 3,551,125 | 12/1970 | Hallewell ............................... 51/293 |
| 3,632,320 | 1/1972 | Henmi et al. ........................... 51/298 |
| 3,770,400 | 11/1973 | Hallewell ............................... 51/293 |

*Primary Examiner*—Donald J. Arnold
*Attorney, Agent, or Firm*—Allison C. Collard

[57] ABSTRACT

An abrasive composition prepared by kneading abrasive grains and a binder together, with addition of a filler when desired, is molded into a block, which is heated by a high-frequency wave heater and then passed between multiple pairs of rolls and thereby rolled into a sheet. Circular pieces are blanked out from the rolled sheet and subsequently baked to continuously produce resinoid wheels.

5 Claims, 6 Drawing Figures

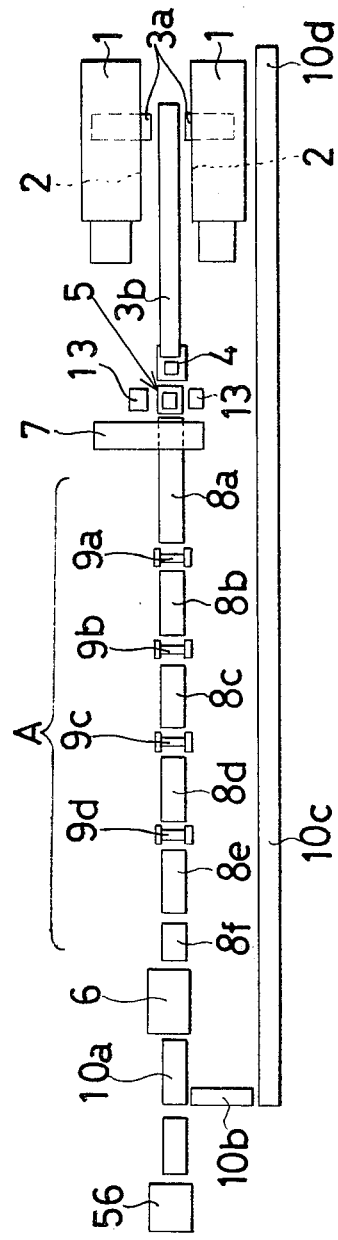
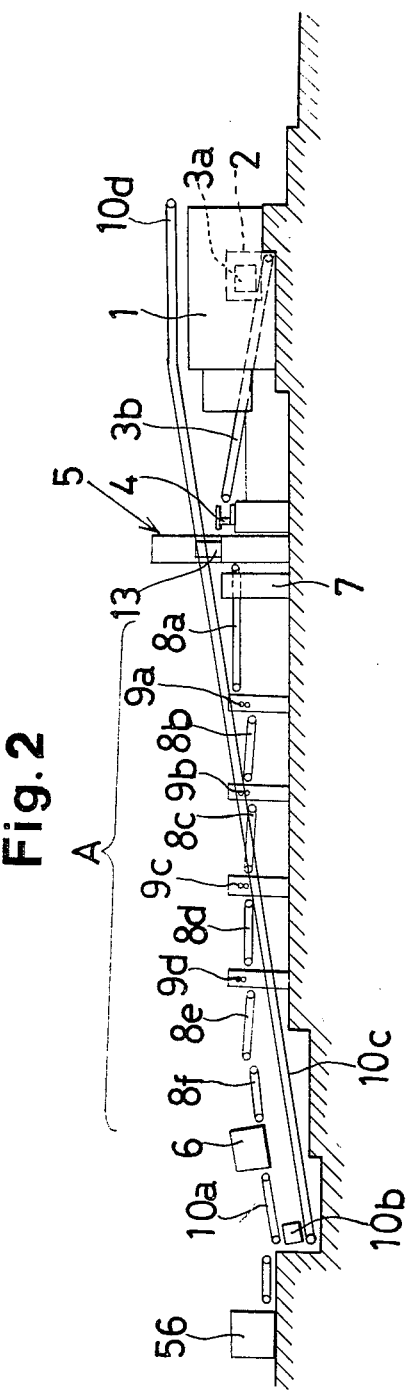

METHOD FOR CONTINUOUSLY PRODUCING RESINOID WHEELS

BACKGROUND OF THE INVENTION

The present invention relates to a method and an apparatus for continuously producing resinoid wheels for cutting hard metal materials.

Conventionally, resinoid bonded grinding wheels have been produced by placing a kneaded resinoid abrasive composition into a die of a given shape, smoothing the surface of the composition with raking means to give a uniform thickness to the mass of the composition, molding the composition at an elevated pressure and baking the molded product. However, this method has the drawback that relatively coarse abrasive grains are caught by the raking means and brought to the surface, rendering the resulting product uneven in grain size distribution. It has therefore been necessary to prepare abrasive grains of a uniform size by using a three-stage screening apparatus, but the procedure involved is very troublesome and takes a long time. Depending on the screens employed, moreover, about 10% of oversize grains and fines are separated off and discarded as being unsuitable for use. Thus the conventional grinding wheels are expensive to make. It is also noted that even with the use of the three-stage screening apparatus, the selected abrasive grains still have varying sizes, this inevitably entailing the foregoing drawback. Further according to the conventional method, the raked mass of the starting abrasive composition is pressed on one side for molding, with the result that there arises a difference between the pressures acting on the upper and lower surfaces of the molding. When the molding is baked which has been pressed on one side and is uneven in grain size distribution, the grinding wheel obtained becomes uneven in hardness, inasmuch as the product has high hardness where many coarse abrasive grains are present but low hardness where smaller grains are predominant. When put to use, the grinding wheel wears away more markedly where it contains many fine abrasive grains than where coarse grains predominate, so that an uneven wear takes place. As a result, the grinding wheel not only fails to cut a work straight but is also subjected to an objectional force and possibly broken in an extreme case. Moreover, if the abrasive composition is not fully raked, the resulting product will have a nonuniform thickness, consequently producing errors when cutting a hard metal material, and a markedly irregular portion of the grinding wheel, if any, will cause an objectionable force to act on and break the grinding wheel during use. In addition to the many drawbacks of the conventional method described above, the aforementioned raking means must operate with very high accuracy and is therefore expensive and requires a cumbersome maintenance procedure. The raking procedure is inconvenient in that it must be followed in a constant temperature and constant humidity chamber so as to render the abrasive composition free of changes in volume.

SUMMARY OF THE INVENTION

This invention provides a method and an apparatus for producing resinoid wheels which have overcome the foregoing problems.

The invention is characterized by a method for producing a resinoid wheel comprising the steps of kneading abrasive grains and a binder together, molding the kneaded mixture into a block, heating the molded block, rolling the heated block into a sheet, blanking out circular pieces from the sheet and baking the circular pieces.

The invention is further characterized by an apparatus for practicing the above method to produce a resinoid wheel comprising a kneader for kneading a resinoid abrasive composition, a molding machine for molding the kneaded composition into a block, a high-frequency wave heater for the molded block, a rolling machine for rolling the heated block with multiple pairs of rolls, a blanking press for blanking out circular pieces from the rolled sheet and means for baking the circular pieces.

According to the present method, a molded block of resinoid abrasive composition is efficiently rolled into a sheet of resinoid abrasive product which is tough, free of any distortion and has accurate thickness and good quality. The present method which does not require any raking means unlike conventional method need not use abrasive grains of a uniform size, so that the three-stage screening device heretofore used can be dispensed with, making it unnecessary to discard a portion of the granular abrasive material which will entail a cost increase. Since the block of resinoid abrasive composition is passed between multiple opposing pairs of rotating rolls in succession and is thereby rolled into a sheet, the block is subjected to equal pressures on its opposite surfaces without permitting any uneven distribution of grain sizes. Whereas it has been entirely infeasible to use abrasive grains of fairly different sizes in combination, a resinoid wheel can be produced from a mixture of such abrasive grains according to this invention. In fact, the resulting product has a very high cutting ability. Thus the present invention eliminates the need for various expensive devices and troublesome procedures which have conventionally been required and make it possible to mechanically produce a large quantity of resinoid wheels at a very low cost. Moreover the resinoid wheels obtained, perfectly uniform in hardness as well as in thickness, are free of cutting errors and breakage to assure a uniform and trouble-free operation to cut metal materials.

The useful method of this invention can be practiced by the apparatus of the invention. It is simple to operate and ensures continuous production of abrasive wheels having high performance.

BRIEF DESCRIPTION OF THE DRAWINGS

FIG. 1 is a schematic plan view showing an embodiment in its entirety of the apparatus for producing resinoid wheels according to this invention;

FIG. 2 is a schematic side elevation of the embodiment of FIG. 1;

DESCRIPTION OF THE PREFERRED EMBODIMENTS

Figure 3:
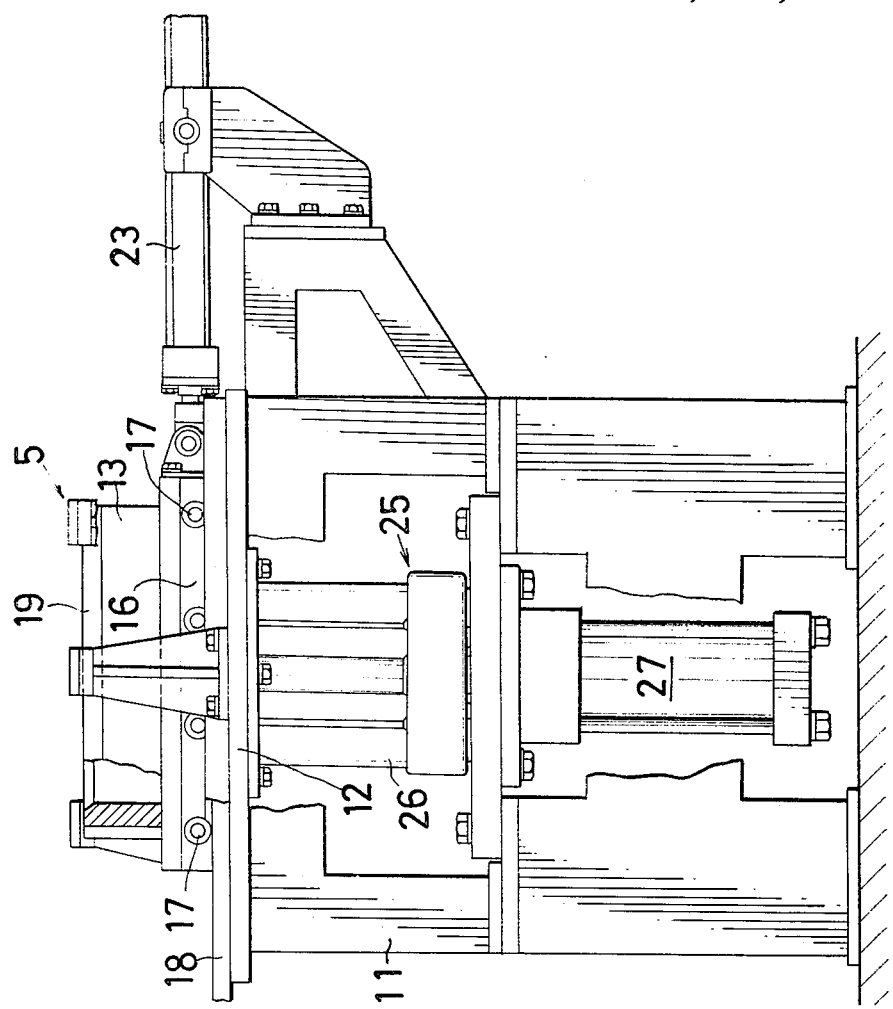
FIG. 3 is an enlarged view in vertical section showing a block molding machine used in this invention.

With reference to FIGS. 1 and 2, about 16- to 220-mesh abrasive grains of silicon carbide, alumina or siliceous sand, a binder such as phenolic resin, epoxy resin, diallyl phthalate resin or like thermosetting synthetic resin and, when desired, a filler such as creolite, iron disulfide, red iron oxide or clay are fed to two kneaders 1 and 1 in specified amounts and kneaded together. The proportions by weight of these ingredients in the abrasive composition are 60 to 90 parts of abrasive grains, 10 to 20 part of binder and 0 to 20 parts of filler. The above-mentioned examples of each ingredient may be used singly, or at least two of them are usable conjointly. While the composition completely kneaded in one of the kneaders is being drawn off at a constant rate from an outlet 2 at its inside lower portion, the starting composition is fully kneaded in the other kneader. Scraps of uncured pre-molded composition resulting from the blanking step are fed to this kneader at a given rate along with the other ingredients as will be described later. The kneaded composition run off from the kneader 1 is sent out by conveyors 3a and 3b to automatic weighing means 4 to automatically weigh the composition and is thereafter fed to a block molding machine 5. The molding machine 5 includes a falt platelike upper die 20 positioned at its center and movable up and down and two hoxlike lower dies 13 alternately movable outward from the center and then inward. The upper and lower dies 20 and 13 are heated to a temperature, for example, of 70° to 80° C. The resinoid abrasive composition is subjected by the molding machine 5 to pressure, for example, of 80 to 140 kg/cm$^2$ for 20 to 60 seconds and is thereby molded in succession into blocks having sizes in the range of from 260 mm × 380 mm × 25 mm to 400 mm × 500 mm × 40 mm. The molded block is then heated, for example, to 40° to 75° C for 15 to 25 seconds by a high-frequency wave heater 7 and is fed to a rolling machine A including multiple pairs of rolls. Thus the heated block is fed by a conveyor 8a to rolls 9a for rolling. Usually it is preferable to conduct the rolling operation at least twice. The abrasive material is then sent to rolls 9b, 9c and 9d in succession by conveyors 8b, 8c and 8d. The rolling operation is therefore conducted four times in the illustrated embodiment. By the rolling step, the abrasive composition is made into a sheet 400 mm to 1,200 mm in width and 1 to 15 mm in thickness. The sheet is then fed by conveyors 8e and 8f to a press 6, by which circular pieces are blanked out from the sheet. In the present embodiment, two to four circular abrasive pieces are blanked from one sheet. The resulting scraps are returned to the kneaders 1 by way of conveyors 10a, 10b and 10c. The terminal end 10d of the conveyor 10c is positioned above the kneaders 1 and the scraps are supplied to eigher one of the kneaders 1 at a given interval. Preferably, infrared projectors are provided above and below the conveyors 8b to 8f to prevent the sheet from cooling. The circular pieces obtained are then placed between polished iron discs and baked on a tunnel type electric furnace 56 or like device at a temperature suitable for the curing of the aforementioned synthetic resin used as the binder. For baking, the circular pieces are heated by progressively elevating the temperature from room temperature to 180° C over a period of about one day.

If rolls coated with rubber or some other material equivalent thereto such as elastic synthetic resin, copper, lead, soft zinc or like soft metal are employed as the terminal pair of rolls for rolling the block of abrasive composition, the uncured resinoid abrasive piece obtained can be made rough-surfaced on its opposite sides. When baked, the piece will make an improved resinoid wheel.

More specifically, the resinoid bonded grinding wheel thus produced has rough front and rear surfaces with the abrasive grains alone projecting therefrom and therefore exhibits a greatly improved cutting ability. In fact, such grinding wheel is capable of cutting steel pipes and like hard metal materials easily, rapidly and with reduced heat generation to produce a cut surface which is free of burning, distortion and discoloration. The resulting cut-off metal piece is accordingly suitable for the subsequent treatment. In this case the apparatus may advantageously include five pairs of rolling rolls, with the terminal pair of rolls covered with rubber, and an additional high-frequency wave heater disposed immediately before the terminal pair to prevent the rolled sheet from cooling and to render the sheet rough-surfaced on its front and rear sides.

Figure 4:
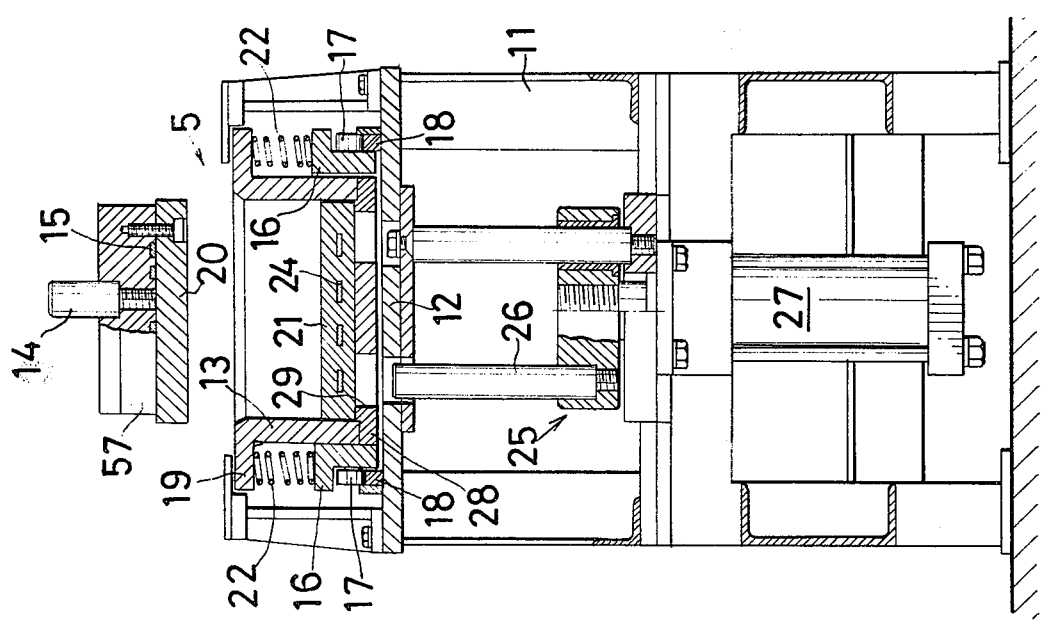
FIG. 4 is a fragmentary front view of the block molding machine shown in FIG. 3.

With reference to FIGS. 3 and 4 the block molding machine 5 includes support columns 11 on the top ends of which an upper plate 12 is placed. Disposed at the center of the machine 5 is a die holder 57, to which is fixed a vertical ram 14. The aforementioned upper die 20 in the form of a flat plate and provided with a heater 15 is attached to the lower end of the ram 14 and is movable up and down. Mounted on the top plate 12 are rails 18 on which are placed two boxlike carriages 16 having wheels 17. The lower die 13 in the form of a box having an outwardly projecting flange 19 at its upper end and a loosely fitting bottom 21 is placed on each of the carriages 16 with shock-absorbing springs 22 interposed therebetween. The carriages 16 are movable sidewise away from the center of the molding machine 5 by the operation of hydraulic cylinders 23 provided on the opposite sides of the machine 5. The kneaded abrasive composition is placed into one of the lower dies 13, which is then brought to the center of the machine 5 by the hydraulic cylinder 23, whereupon the upper die 20 is lowered to press and mold the composition to a block. At this time, the upper die 20 has been heated by a heater 15 and, the lower die 13 by a heater 24, to a temperature of 70° to 80° C, at which the abrasive composition is premolded to hardness suitable for the subsequent rolling operation. In the meantime, the abrasive composition is supplied to the other lower die 13. The lower die 13 containing the molded composition is retracted sidewise from the center of the machine 5. Disposed on the opposite sides of and below the molding machine 5 are knockout means 25 having knockout pins 26 which are movable up and down by vertical hydraulic cylinders 27. When the lower die 13 is retracted sidewise to the position immediately above the knockout means 25, the knockout means 25 functions to force the knockout pins 26 through the apertures 29 in the bottom plate 28 of the carriage 16 to push up the bottom plate 21 of the lower die 13 and to thereby release the block from the lower die 13. Simultaneously with this, the other lower die 13 is brought to the center of the molding machine 5, followed by compression molding in the same manner as above. In this way, the abrasive composition is placed into the two lower dies 13 alternately and subjected to compression molding in alternating manner.

Figure 5:
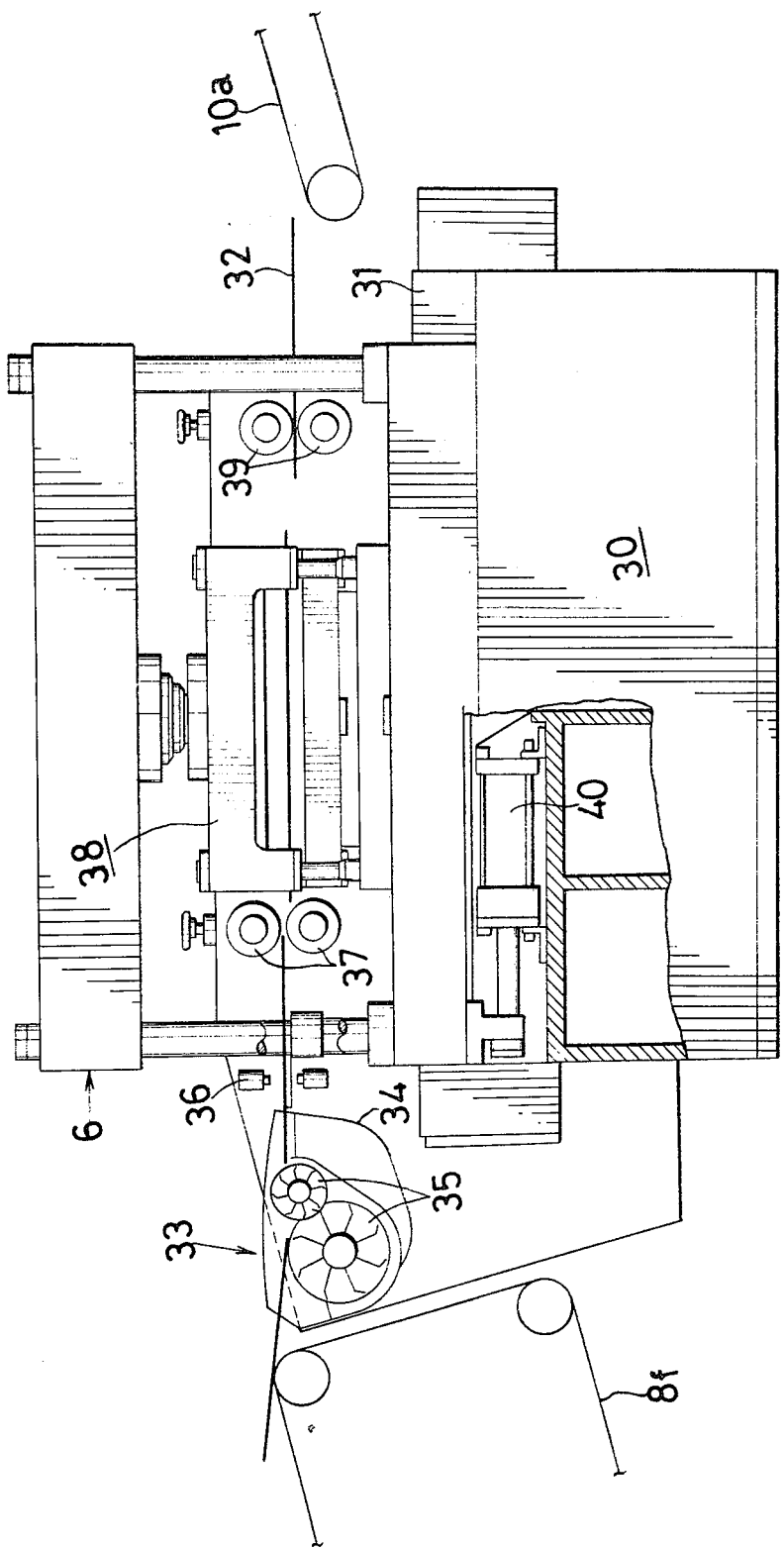
FIG. 5 is a side elevation partly broken away and showing a blanking press used in this invention.
Figure 6:
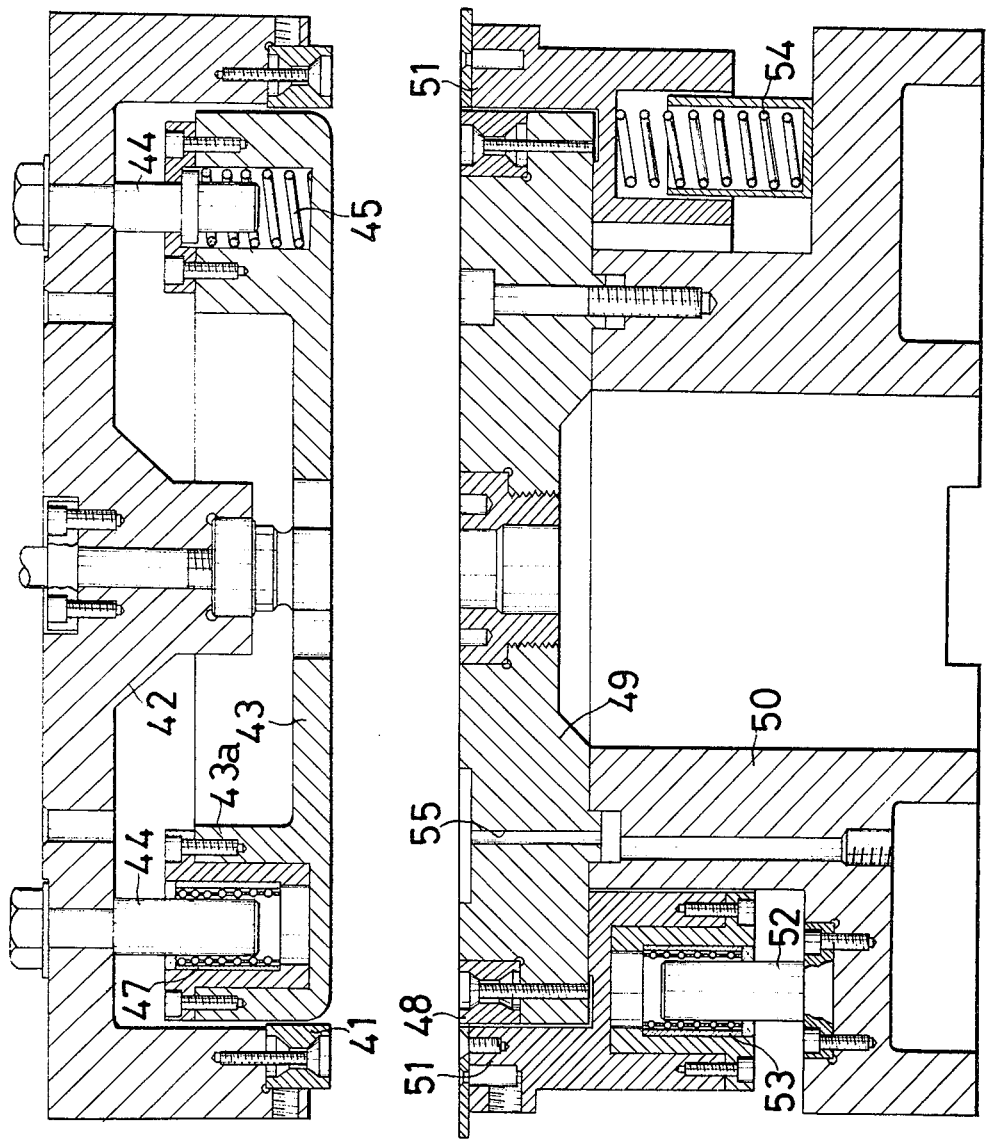
FIG. 6 is a fragmentary enlarged view in section of the blanking press shown in FIG. 5.

The blanking press 6 shown in FIGS. 5 and 6 is formed in its bottom portion with grooves of an inverted U-shaped cross section which fit over guide members 31 on a base frame 30. By the operation of a hydraulic cylinder 40, the blanking press 6 is slidable in one direction along the uncured rolled sheet of abrasive composition. A releasing agent is applied to the under surface of the rolled sheet to eliminate its tackiness by being passed through means 33 comprising a container 34 filled with sand or like releasing agent and two rotary blade wheels 35 therein. A photoelectric tube 36 detects the sheet, whereupon the blanking press 6 is initiated into operation. The abrasive sheet 32 is sent into a die set 38 by feed rollers 37 and, at the same time, the whole blanking press 6 slides along on the guide members 31 on the base frame 30. Simultaneously with this, the upper blade 41 of punch of the die set 38 descends and comes into contact with the annular movable member 51 of the die, permitting a lower blade 48 and its holder 49 to push up the movable member 43 of the punch at the same time, whereby a circular abrasive piece is blanked out. The annular upper blade 41 is fixed to the periphery of an upper blade holder 42 which is substantially in the form of a disc. The circular movable plate 43 has an upstanding flange 43a and is disposed in a recess in the rear side of the upper blade holder 42. Four pins 44 suspended from the upper blade holder 42 retain the movable plate 43 within the recess, with springs 45 and ball slide bearings 47 interposed between the upper blade holder 42 and the circular movable plate 43. The annular lower blade 48 is fixed to the periphery of the holder 49 secured to a support frame 50. The annular movable member 51 for receiving the upper blade 41 is positioned outside the lower blade and supported by support members 52 on the frame 50. springs 54 and ball slide bearings 53 are interposed between the movable member 51 and the support frame 50. When blanking abrasive pieces, compressed air is forced against the under surface of the abrasive sheet from an air outlet 55. The air outlet 55 is provided to permit smooth movement of the abrasive sheet like the aforementioned means 33 for applying the releasing agent. Accordingly, one of the outlet and the applicator means may be used.

The abrasive piece thus blanked out is forced out by the leading end of the following advancing abrasive sheet 33 and is drawn out by withdrawing rollers 39 from the blanking press 6 onto the conveyor 10a, which in turn feeds the piece into baking means 56 in which the piece is baked by being heated from room temperature to 180° C over a period of about 24 hours.

Further in the case where rolls coated with rubber or some other soft material are used as the terminal pair of rolls for rolling the molded block of the abrasive composition as described previously, the rolled sheet will be rough-surfaced. Therefore, the abrasive grains alone project from the front and rear surfaces of the grinding wheel obtained. Consequently, when cutting a metal material, the grinding wheel will contact therewith over a reduced area, permitting the exposed abrasive grains alone to contact the metal material to exhibit a greatly improved cutting ability.

The present invention can be embodied in other different modes without departing from the spirit and basic features of the invention. For example, only one kneader may be employable in place of the two kneaders used in the foregoing embodiment. Thus the embodiment therein disclosed is given for illustrative purposes only and is not limitative in any way. The scope of this invention is defined by the appended claims rather than by the above specification. All the modifications and alterations within the scope of the claims are to be construed as being covered by the claims.

What is claimed is:

1. A method for producing a resin-bonded abrasive wheel comprising the steps of:
    a. kneading abrasive grains having a mesh size in the range of about 16 to 220 mesh, and an uncured thermosetting synthetic resin binder therefor, in the proportion of about 60 to 90 parts by weight of abrasive grains to about 10 to 90 parts by weight of said binder, to form an abrasive composition suitable for molding;
    b. molding said abrasive composition at a temperature from about 70° to about 90° C and at a pressure from about 80 to about 140 kg/cm$^2$ for about 20 to 60 seconds, to form a molded block having a thickness of 25 to 40 mm.;
    c. heating said molded block by high frequency wave energy heating at a temperature of about 40° to about 75° C for about 15 to about 25 seconds;
    d. rolling said block by multiple pairs of rolls to form a resin-bonded abrasive sheet blank having a thickness of 1 to 15 mm.;
    e. blanking out a circular piece from said sheet; and
    f. baking said circular piece at a temperature from room temperature to 180° C for a period of 20 to 30 hours to form said wheel.

2. The method as set forth in claim 1 wherein at least one filler selected from the group consisting of creolite, iron disulfide, red iron oxide and clay is further incorporated into the abrasive composition by the kneading step.

3. The method as set forth in claim 2 wherein the abrasive composition comprises 60 to 90 parts by weight of the abrasive grains, 10 to 20 parts by weight of the binder and 0 to 20 parts by weight of the filler.

4. The method as set forth in claim 1 wherein the block of the abrasive composition has a thicknes of 25 to 40 mm and is rolled by multiple pairs of rolls of the rolling step into a sheet having a thickness of 1 to 15 mm.

5. The method as set forth in claim 4 wherein the sheet of abrasive composition is eventually rough-surfaced on its front and rear surfaces by the terminal pair of rolls of the rolling step.

* * * * *